United States Patent [19]

Nakajima et al.

[11] 4,114,648
[45] Sep. 19, 1978

[54] DOUBLE ACTING ELECTROMAGNETIC VALVE

[75] Inventors: Hiroyuki Nakajima, Ashiya; Takashi Hosokawa, Osaka, both of Japan

[73] Assignee: Konan Electric Co., Ltd., Nishinomiya, Japan

[21] Appl. No.: 645,135

[22] Filed: Dec. 29, 1975

[30] Foreign Application Priority Data

Dec. 25, 1974 [JP] Japan .................................... 48-2573

[51] Int. Cl.² ............................................ F16K 11/00
[52] U.S. Cl. ................... 137/625.5; 137/625.65;625.5; 251/137; 251/139
[58] Field of Search ..................... 137/625.65; 251/65, 251/137, 139

[56] References Cited

U.S. PATENT DOCUMENTS

| | | | |
|---|---|---|---|
| 2,682,386 | 6/1954 | Lindsay | 137/625.5 X |
| 2,983,278 | 5/1961 | Heintz | 251/137 X |
| 3,339,664 | 9/1967 | Beveridge et al. | 251/139 X |
| 3,378,121 | 4/1968 | Foret | 251/139 X |
| 3,383,084 | 5/1968 | Mayfield | 251/137 X |
| 3,548,877 | 12/1970 | Aumayer | 137/625.65 |
| 3,809,123 | 5/1974 | Heimann | 137/625.5 |
| 3,880,476 | 4/1975 | Belart et al. | 137/625.65 X |

FOREIGN PATENT DOCUMENTS

| | | | |
|---|---|---|---|
| 1,232,424 | 1/1967 | Fed. Rep. of Germany | 251/139 |
| 1,550,632 | 2/1970 | Fed. Rep. of Germany | 137/625.65 |
| 411,264 | 12/1966 | Japan. | |

Primary Examiner—Irwin C. Cohen
Attorney, Agent, or Firm—Sughrue, Rothwell, Mion, Zinn and Macpeak

[57] ABSTRACT

A double acting electromagnetic valve is composed of a tubular main body internally having a valve chamber, a pair of magnetic cores each having a concentric polar arrangement thereby to provide an E-shaped axial section, secured respectively on both sides of the main body, the cores being made of a magnetic material exhibiting high residual magnetism, a magnetic member slidably received in the valve chamber, two coils each encased in an annular recess formed between the central pole leg and the circumferential pole leg of the magnetic core, fluid passages provided through the central pole legs of the magnetic cores, a valve seat formed at an end of each fluid passage exposed to the valve chamber, and valve means provided on the slidable magnetic member to abut against the valve seats.

3 Claims, 1 Drawing Figure

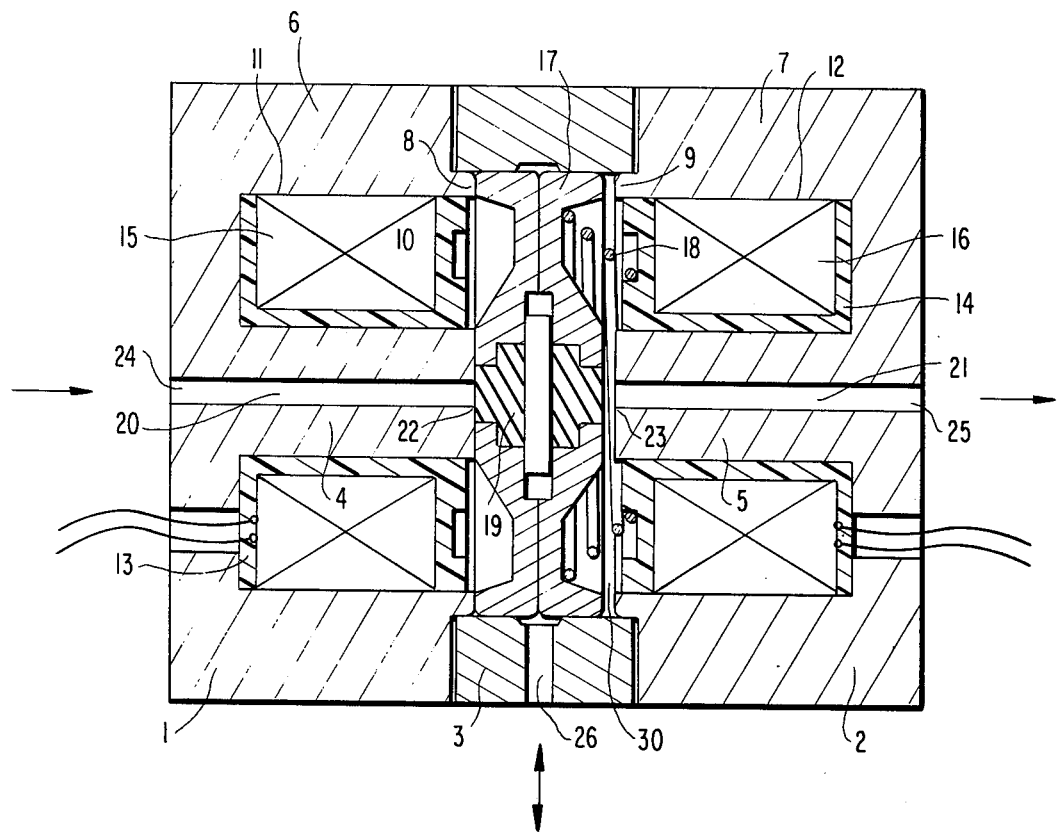

DOUBLE ACTING ELECTROMAGNETIC VALVE

BACKGROUND OF THE INVENTION

This invention relates to a double acting (or double coil) electromagnetic valve wherein the basic concept disclosed in my Japanese Patent No. 479023 (Patent Publication No. 1264/1966) is used in combination with new concept of positively utilizing residual magnetism.

Double acting electromagnetic valves, which are also referred to as double solenoid-operated electromagnetic valves, are widely known. A typical construction of these valves comprises two electromagnets including two magnetic cores and two coils. When one of the coils is energized, the electromagnetic valve is transferred from a normal operating position to another operating position and held at this position even after the coil has been deenergized. When it is desired to set the valve back to the normal operating position, another coil must be energized. The valve thus set back to the normal operating position is held at the normal operating position, even after the second coil has been deenergized, until the first coil is energized.

The electromagnetic valve of this type has the advantage that it inhibits spontaneous transfer of the valve in the case of, for instance, power failure. However, the construction of the valve is complicated because of the two electromagnets provided separately, and the size thereof is comparatively great.

SUMMARY OF THE INVENTION

A fundamental object of the present invention is to provide a double acting electromagnetic valve which is far simpler in construction and far smaller in size than the conventional double solenoid operated electromagnetic valve.

Another object of the invention is to provide a double acting electromagnetic valve wherein residual magnetism is positively used for simplifying the construction.

Still another object of the invention is to provide a double acting electromagnetic valve whose operation is made reliable despite of the use of the residual magnetism.

The double acting electromagnetic valve according to the invention comprises a hollow main body having internally a space acting as a valve chamber, a pair of magnetic cores each having a concentric pole arrangement to provide an E-shaped axial section, secured to two lateral surfaces of the main body so that the end of the central leg of the magnetic core and at least one part of the ring-formed end surface of the outer part of the magnetic core are disposed within said valve chamber, the magnetic cores being made of a magnetic material having a high residual magnetism such as heat-tempered high carbon steel, a shiftable magnetic member positioned in the valve chamber so that the member is brought into tight contact with said end of the central leg and said one part of the outer end surface of the magnetic core on each side of the main body when the member is moved toward the magnetic core, two solenoid coils each encased in a coil receiving annular recess formed between the central leg and the outer part of the magnetic core, fluid passages formed through the central legs of the magnetic cores, a valve seat formed at the end of each fluid passage exposed to the valve chamber, and valve members provided on the surfaces of said slidable magnetic member to abut against the valve seats.

The invention will be better understood from the following detailed description of the invention when read in conjunction with the accompanying drawing.

BRIEF DESCRIPTION OF THE DRAWING

The single drawing is a side elevational view sectioned along an axial plane of an example of an electromagnetic valve according to the present invention.

DETAILED DESCRIPTION OF THE INVENTION

As mentioned hereinbefore, this invention is a double acting electromagnetic valve, which utilizes the basic concept of the Japanese Patent No. 479023 (Patent Publication No. 1264/1966) in combination with the novel feature of utilizing residual magnetism of the magnetic core material positively.

In a basic example of the double acting electromagnetic valve indicated in the accompanying drawing, a pair of magnetic cores 1 and 2, each having a concentric pole arrangement comprising a central pole leg 4 or 5 and an outer annular pole leg 6 or 7 combined at one end in unison thereby having an E-shaped axial cross section, are secured to the lateral side surfaces of a hollow cylindrical main body 3 so that the concentrically arranged poles of the magnetic cores 1 and 2 are directed toward the main body 3. More specifically, the hollow cylindrical main body 3 has internally a space opening toward the lateral sides of the main body thereby to form a valve chamber 10, and the magnetic cores 1 and 2 are secured by any suitable means to the lateral sides of the main body 3 in a manner such that the central pole legs 4 and 5 and at least one part 8 and 9 of the end surfaces of the outer annular pole legs 6 and 7 of the magnetic cores 1 and 2 are disposed in a mutually opposing relationship within the valve chamber 10 formed within the main body 3. Also, the engagement between cylindrical main body 3 and the outer cylindrical legs 6 and 7 provides a fluid tight seal, thereby preventing fluid communication with chamber 10 except thru ports 24, 25 and 26.

The annular spaces formed between the central pole legs 4 and 5 and the outer annular pole legs 6 and 7 provide coil receiving recesses 11 and 12, respectively, and solenoid coils 15 and 16 wound on bobbins 13 and 14 are encased in these coil receiving recesses 11 and 12. Both ends of electric wires forming the coils 15 and 16 are led outside of the magnetic cores 1 and 2 as shown, thereby permitting the supply of electric current through these coils.

Within the valve chamber 10, a member 17 of a magnetic material is received to be shiftable rightward and leftward as viewed in the drawing along the axial direction of the main body 3, (coincident with the arrows), and the member 17 is formed with lateral surfaces so arranged that either one of the surfaces is brought into tight contact with the end face of the central core leg 4 and the surface 8 of the outer annular core leg 6 of the magnetic core 1 when the member 17 is moved toward the magnetic core 1, and the other surface of the member 17 is brought into tight contact with the end face of the central core leg 5 and the surface 9 of the outer annular core leg 7 when the member 17 is moved toward the magnetic core 2. A spring member 18 is provided in the valve chamber between the inner side of the magnetic core 2 and the lateral surface of the magnetic member 17 facing to the magnetic core 2 thereby to press the member 17 leftwardly as viewed in the drawing toward the normal position of the double acting electromagnetic valve. At the central part of the magnetic member 17 there is provided a valve member 19 made of a rubber-like substance. Through the central core legs 4 and 5, holes 20 and 21 for passing fluid are provided, respectively, and valve seats 22 and 23 are formed at the ends of the holes 20 and 21 opening into the valve chamber 10. Each valve seat is engageable with the valve member 19 when the magnetic member 17 is moved to the side of the valve seat. The other ends of the holes 20 and 21 constitute an entrance port 24 and an exit port 25 for the fluid.

The double acting electromagnetic valve of the above described construction can operate as follows.

In the indicated state of operation, the valve seat 22 is closed by the valve member 19, and therefore the fluid supplied through the entrance port 24 is thereby blocked. When the coil 16 is energized, the magnetic core 2 is magnetized. The magnetic member 17 is thus moved rightward and the valve member 19 engages with valve seat 23. The fluid supplied through the entrance port 24 is now allowed to flow through the hole 20 into the valve chamber 10 and to flow out through another exit port 26 provided through the main body 3.

Since the magnetic core 1 as well as the magnetic core 2 is made of a magnetic material having a high residual magnetism such as a heat-tempered high carbon steel or a magnet steel, the magnetic member 17 is held by the residual magnetism of the magnetic core 2 even after the interruption of the energization of the coil 16, and the operation of the valve is maintained in this state. The holding action of the magnetic core 2 is extremely strong because the magnetic path through the magnetic member 17 and the magnetic core 2 is completely closed and no air gap is formed in the magnetic path. More specifically magnetic fluxes passing through the central core leg 5 flow through the outer core leg 7 of an annular cross section to the end surface 9 thereof, and then flow through the slidable magnetic member 17 to be returned to the central core leg 5.

When it is desired to set back the valve operation to the normal state, the coil 15 is energized thereby exciting the magnetic core 1. The magnetic member 17 is then attracted to the interior side of the magnetic core 1 by a magnetic force ordinarily stronger than that of the residual magnetism of the magnetic core 2, and is held in this state by the residual magnetism of the magnetic core 1 even after the interruption of the energization of the coil 15. The difference between the attracting force of the magnetic core at the time of energization of the coil and the force caused by the residual magnetism may be selected to a suitable value by selecting the material of the magnetic cores. In the example as shown, a carbon steel S50C for machine structural use defined and published in Japan Industrial Standard G 4051 is used after subjecting it to a heat tempering process, and an advantageous result is obtained at an economical price. The slidable magnetic member may be made of a magnetic substance having low residual magnetism or high residual magnetism.

Upon movement of the magnetic member 17 leftward as viewed in the drawing, the valve member 19 abuts against the valve seat 22 thereby blocking the flow of a fluid from the entrance port 24 into the valve chamber 10. The valve chamber 10 is now communicated with the exhaust port 25 through the valve seat 23 and the hole 21, thereby communicating the exit port 26 with the exhaust port 25 and placing the electromagnetic valve into the normal operating state.

Since the magnetic core 1 and the magnetic member 17 form a completely closed magnetic circuit in a similar manner as disclosed hereinbefore, the holding action of the magnetic core 1 is much stronger than the attracting force due to the residual magnetism of the magnetic core 2 acting through an air gap 30 between the end surface 9 of the magnetic core 2 and the corresponding surface of the magnetic member 17, even after the deenergization of the magnetic core 1, whereby the member 17 is held to the leftward position and the electromagnetic valve is maintained in the normal operating state.

In view of the above description, it is now apparent that a double acting electromagnetic valve of a type in which a valve member 19 is placed into an operating position by the energization of a coil 16 and is held to this position by the residual magnetism of the core 2 even after the deenergization of the coil 16, and the valve member 19 is retracted to and held in the normal operating position by the energization of the coil 15 is obtained.

The exhaust port 25, fluid passing hole 21, and the valve seat 23 may also be omitted to provide a two port valve acting between the entrance port 24 and the exit port 26, or the entrance port 24 may be changed into another exit port thereby to provide a normal-flow type three-port valve. It is apparent that further modifications may be obtained by combining these ports in various manners.

Regardless of these modifications, the characteristic features of the invention of providing magnetic cores made of a material having high residual magnetism and disposing the operative ends of the magnetic cores directly into the valve chamber are preserved. Thus, the valve member once moved to an operative position under the action of one electromagnet can be held to the position by the effect of the residual magnetism even after the deenergization of the electromagnet, and the effect of the residual magnetism can be much enforced by the closed magnetic circuit formed between the magnetic core and the slidable magnetic member supporting the valve member. Furthermore, the basic concept of providing a movable magnetic member within the fluid passage disclosed in my Japanese Patent No. 479023 (Patent Publication No. 1264/1966) is utilized in combination with the aforementioned features, thereby providing a double acting electromagnetic valve of simple construction, small is size, reliable in operation, and economical in manufacture. The valve of this invention may further by utilized as a pilot valve coupled in combination with either one of two-port, three-port, and four-port valves of a greater size, thereby providing a device for controlling a greater quantity of fluid.

What is claimed is:

1. A double acting electromagnetic valve comprising a hollow main body having internally a space acting as a valve chamber, a pair of magnetic cores each having a concentric polar arrangement and an E-shaped axial cross section, secured respectively to two lateral surfaces of said main body such that the end of the central leg of each magnetic core and at least one part of the annular end surface of the outer leg of each said core are disposed directly within said valve chamber, a movable magnetic member positioned in said valve chamber so as to be shiftable axially therein between said pair of cores to bring the magnetic member into tight contact with said end of the central leg and said one part of the annular end surface of the outer leg of either one of said magnetic cores when the member is moved to an extremity of said chamber, two coils each encased in a coil-receiving recess formed between the central leg and the outer leg of the magnetic cores, respectively, said coils being adapted to be energized to magnetize the respective magnetic core to bring said magnetic member into said tight contact positions, respectively, said magnetic cores being made of high carbon steel constituting a magnetic material which is not a permanent magnet but has sufficient residual magnetism to retain said movable member in its respective tight contact position following deenergization of said respective coils, a fluid passage formed through the central leg of each one of the magnetic cores and in said main body, a valve seat formed at the end of each core fluid passage exposed to said valve chamber, valve members provided on said shiftable magnetic member to abut against the valve seats, and said valve members being united into a single valve member made of a rubberlike material and exposed to both sides of said magnetic member.

2. A double acting electromagnetic valve as set forth in claim 1 wherein said magnetic cores are made of a heat-tempered high carbon steel.

3. A double acting electromagnetic valve as set forth in claim 1 further comprising a spring means positioned within said chamber to bias said magnetic member towards one of its slidable extremities.

* * * * *